3,337,597
METHOD FOR MAKING ORGANOSILICON HYDRIDES
Abe Berger, Schenectady, N.Y., assignor to General Electric Company, a corporation of New York
No Drawing. Filed Dec. 23, 1963, Ser. No. 332,911
7 Claims. (Cl. 260—448.2)

ABSTRACT OF THE DISCLOSURE

Partial reduction of diphenyldichlorosilane to diphenylchlorosilane is achieved by adding diphenyldichlorosilane to a mixture of lithium borohydride and an ether solvent. If desired, the lithium borohydride can be generated in situ by the use of a lithium halide and an alkali metal borohydride, such as sodium borohydride or potassium borohydride.

---

The present invention relates to a method for partially reducing diorganodihalosilanes. More particularly, the present invention relates to the reaction of lithium borohydride and diorganodihalosilane and the production of diorganohalosilanes.

It is generally known that diorganohalosilanes having the formula, (1)   $R_2Si(H)X$ in which R is the same or different and selected from a monovalent hydrocarbon radical, a halogenated monovalent hydrocarbon radical, and X is a halogen radical, are quite valuable for introducing $R_2Si(H)O_{.5}$ units into a variety of organopolysiloxane compositions. These compositions can be further modified through catalyzed addition reactions to provide for the production of valuable copolymers. Presently, known methods for making diorganohalosilanes of Formula 1 are limited to direct reaction of silicon with organic chloride, as shown in Rochow Patent 2,380,995, the use of organometallic reagents with halohydrosilanes or catalyzed interchange between silicon halide and silicon hydride. Although these methods can provide for advantageous results in particular situations, those skilled in the art know that in many instances these methods are often undesirable. It is well known, for example, that organometallics, such as Grignard reagents, organolithium compounds, etc. require special preparation, are highly unstable, and are restricted to materials which are free of polar radicals, such as nitro, ester, nitrile, carboxylic acid, etc. radicals. Redistribution reactions also are often undesirable; it is difficult to favor the formation of a particular product without the production of a variety of other products. In addition, aryl silicon bonds often cleave readily in the presence of redistribution catalysts. The direct reaction of silicon and organic chloride by the method of Rochow moreover, is only advantageous in instances where both R's of Formula 1 are the same. It would be desirable therefore to provide for the direct production at high yields of diorganohalosilanes of Formula 1 in an easy and desirable manner, by the use of readily available starting materials.

The present invention is based on the discovery that diorganohalosilanes shown by Formula 1 can be made by partially reducing readily available diorganodihalosilanes having the formula, (2)   $R_2SiX_2$ where R is defined above and can be the same or different radical, and X can be chloro, bromo, iodo, or fluoro. Partial reduction of diorganodihalosilane of Formula 2 can be effected by employing a mixture of lithium borohydride and an ether. The term "lithium borohydride" as utilized in the present invention, designates the chemical compound $LiBH_4$, and the in situ form of this compound which can be produced by reacting LiX with $YBH_4$, where X is defined above, and Y is an alkali metal selected from sodium, potassium, rubidium, and cesium. In addition, $LiBH_4$ also designates the regeneration of this compound in situ from a mixture of an ether and a major amount of a metal hydride such as YH, and a minor amount of $LiBH_4$ or a mixture of LiX with $YBH_4$.

In accordance with the present invention there is provided a method for making diorganohalosilane of Formula 1, which comprises (1) reacting a diorganodihalosilane of Formula 2 with lithium borohydride in the presence of an ether, where there is utilized per mole of said diorganodihalosilane, from about 0.5 to about 2 moles of a lithium borohydride reactant selected from
  (a) $LiBH_4$,
  (b) A mixture of substantially equal molar amounts of LiX and $YBH_4$, and
  (c) A mixture of from about 0.5 to 2 moles of YH and from about 0.5 to 5% by weight of said diorganodihalosilane of a member selected from (a) and (b), (2) effecting the separation of borohydride residue from the product of the reaction of (1), and (3) recovering diorganohalosilane from the resulting mixture of (2), where X and Y are defined above.

Radicals included by R of Formulae 1 and 2 are for example, alkyl radicals, e.g., methyl, ethyl, propyl, butyl, octyl, etc. radicals; aryl radicals, e.g., phenyl, naphthyl, tolyl, xylyl, etc. radicals; aralkyl radicals, e.g., phenylethyl, benzyl, etc. radicals; alkenyl radicals, e.g., vinyl, allyl, etc. radicals; alkynyl radicals, e.g., ethynyl, propargyl, etc. radicals; cycloalkyl radicals, e.g., cyclohexyl, cycloheptyl, etc. radicals; cycloalkenyl radicals; e.g., cycloheptenyl, cyclohexenyl radicals, etc., and haloalkyl or haloaryl radicals as p-chlorophenyl, m-bromophenyl, chloropropyl, etc. radicals.

Included by the diorganodihalosilane of Formula 2 are for example, dimethyldichlorosilane, methylethyldichlorosilane, diethyldichlorosilane, methylvinyldichlorosilane, di-n-propyldichlorosilane, methylphenyldichlorosilane, diphenyldichlorosilane, p-chlorophenylphenyldichlorosilane, etc.

Included among the ethers that can be employed in the practice of the present invention in combination with $LiBH_4$, are for example, diethylether, methyl n-propyl ether, ethyl n-butyl ether, di-n-propyl ether, di-tert.-butyl ether, diisoamyl ether, divinyl ether, vinyl methyl ether, cyclopropylmethyl ether, dioxane, pyran, benzylmethyl ether, tetrahydrofuran, dimethylether, or diethylethers of ethylene glycol, diethylene glycol, triethylene glycol, etc. In addition to the aforementioned ethers, other ethers are also included in the scope of the invention as long as they are inert to the reactants during the reaction such as higher alkyl ethers of polyethylene glycol.

In the practice of the invention, a mixture is formed of lithium borohydride, diorganodihalosilane, and an ether. Reaction can be initiated by the employment of external heat. Upon completion of the reaction, the separation of solids produced during the reaction can be effected by filtration, flash distillation, under reduced pressure for example, 10 mm. or less up to about 400 mm. etc., depending upon the physical characteristics of the diorganohalosilane reaction product. The resulting mixture can be fractionated to recover the desired diorganohalosilane.

In forming the reaction mixture, the order of addition of the respective components is not critical. A proportion of ether equivalent to at least 10% by weight of the diorganodihalosilane will provide for effective results. A mixture of ether with an inert cosolvent, such as a hydrocarbon for example, xylene, toluene, etc. also can be utilized to facilitate agitation. In most situations, reaction can be advantageously effected under reflux conditions at atmospheric pressure; a temperature between 0° C. up to the boiling point of the lowest component of the mixture will provide for effective results. Depending upon the conditions employed, therefore, a reaction time of as little as 1 hour or less to several hours or more, for example, 50 or more hours can be required to achieve optimum yields of organochlorosilane.

A significant feature of the present invention is that certain metal salt catalysts can be employed in the reaction mixture to minimize reaction time as well as facilitate the separation of organohalosilane. For example, it has been found that if titanium tetrachloride, or zirconium tetrachloride is utilized at concentrations of from 0.5 to 20 percent based on the weight of diorganodihalosilane, reaction time can be reduced to as little as 2 hours or less. In addition, substantially all of the unconverted diorganodihalosilane that normally presents separation problems in final fractionation is converted to the corresponding diorganosilane, which can be readily separated.

In order that those skilled in the art will be better able to practice the present invention, the following examples are given by way of illustration and not by way of limitation. All parts are by weight.

*Example 1*

There were added 63 parts of diphenyldichlorosilane to a slurry of 13.2 parts of potassium borohydride and 140 parts of tetrahydrofuran. While the mixture was being stirred under an inert atmosphere, there was slowly added 2 parts of lithium chloride which had been predried at 120° for 2 hours. An additional 8.2 parts lithium chloride was then added soon afterward to provide for a mixture having substantially equal molar amounts of lithium borohydride and diphenyldichlorosilane. The reaction was heated to reflux for a period of about 8 hours. The mixture was flash distilled under reduced pressure to effect the separation of the solids from the reaction mixture. There was obtained upon fractionation of the mixture, a 60% yield of diphenylchlorosilane, based on infrared spectrum. The identity of the material was established by its infrared spectrum and boiling point of 126° C. (10 mm). Its identity was further confirmed by comparing it to an authentic sample on the vapor phase chromatograph.

*Example 2*

An equal molar mixture of lithium borohydride and diphenydichlorosilane in tetrahydrofuran was made by adding dropwise, a solution of 25.3 parts of diphenyldichlorosilane in 15 parts of tetrahydrofuran, to a mixture of 50 parts of tetrahydrofuran and 2.4 parts of lithium borohydride which had a purity of about 90%. An exothermic reaction occurred which gradually subsided. The mixture was then heated to reflux and after 6 hours the mixture was flash distilled and diphenylchlorosilane was recovered upon fractionally distilling the resulting distillate. There was obtained a yield of about 60% of diphenylchlorosilane.

*Example 3*

The procedure of Example 1 was repeated except that 2 parts of zirconium tetrachloride were added to the reaction mixture after the complete addition of lithium chloride. It was found that after 3 hours, the reaction mixture contained about 60% by weight of diphenylchlorosilane and considerably less diphenyldichlorosilane than the final reaction mixture of Example 1. This determination of the composition of the mixture was made by the use of vapor phase chromatography. Separation of the liquid products from the solid phase was effected by flash distillation at a pressure of about 10 mm. There was obtained a 60% yield of diphenylchlorosilane by fractionally distilling the distillate.

*Example 4*

An equal molar mixture of lithium borohydride and methylethyldichlorosilane in tetrahydrofuran was reacted as follows:

There were added 14.3 parts of methylethyldichlorosilane to a mixture of 5.4 parts of potassium borohydride, 4.3 parts of lithium chloride and 70 parts of tetrahydrofuran. The mixture was refluxed for 8 hours. The mixture was then flash distilled and the liquid product was further fractionally distilled. There was obtained a 25% yield of methylethylchlorosilane having a boiling point of 71° C., which was identified by its infrared spectrum.

*Example 5*

A mixture having a proportion of about 2 moles of lithium borohydride, per mole of diphenyldichlorosilane was reacted as follows:

There were added 50.6 parts of diphenyldichlorosilane to a mixture of 9.6 parts of sodium hydride, 1 part of lithium borohydride and 80 parts of tetrahydrofuran. The mixture was refluxed for 10 hours and the resulting mixture was then flash distilled to effect separation of liquid product from solid product. The liquid product was fractionally distilled and there was obtained a 16 percent yield of diphenylchlorosilane based on the weight of starting diphenyldichlorosilane. Its identity was confirmed by its vapor phase chromatograph.

*Example 6*

A mixture having equal moles of diphenyldichlorosilane and lithium borohydride in diethylene glycol dimethyl ether is reacted as follows:

There are added 50.6 parts of diphenyldichlorosilane to a mixture of 7.6 parts of sodium borohydride, 8.4 parts of lithium chloride and 100 parts of diethylene glycol dimethyl ether. The mixture is heated to 100° C. for about 8 hours, and the reaction mixture is then flash distilled under reduced pressure to effect separation of liquid product. The liquid product is fractionally distilled and there is obtained 45 percent yield of diphenylchlorosilane based on the weight of starting diphenyldichlorosilane.

*Example 7*

A mixture of equal molar amounts of lithium borohydride and p-chlorophenylphenyldichlorosilane in tetrahydrofuran is reacted as follows:

There is added a solution of 28.7 parts of p-chlorophenylphenyldichlorosilane in 25 parts of tetrahydrofuran to a mixture of 5.4 parts of potassium borohydride, 4.3 parts of lithium chloride, 70 parts of tetrahydrofuran. A slight exothermic reaction occurs. The mixture is refluxed for 8 hours. The mixture is flash distilled away from the solids and then fractionated. p-Chlorophenylphenylchlorosilane is isolated and identified by its infrared spectrum.

*Example 8*

A mixture having about 0.5 mole of lithium borohydride per mole of diphenyldichlorosilane in tetrahydrofuran was reacted as follows:

There were added to a mixture of 2.7 parts of potassium borohydride, 70 parts of tetrahydrofuran and 25.3 parts of diphenyldichlorosilane, 2.2 parts of predried lithium chloride. The reaction mixture was then heated to reflux for 10 hours. The liquid material was filtered away from the solids, flash distilled and fractionated. There was obtained a 15% yield of diphenylchlorosilane. The product was identified by its infrared chromatograph.

Based on the above results, one skilled in the art would know that the present invention provides a valuable means for converting diorganodihalosilane to the corresponding partially reduced diorganohalosilane. This method can be employed for making diorganohalosilanes shown by Formula 1 in which the organo radicals can be different such as methylethylchlorosilane, methylphenylchlorosilane, chlorophenylphenylchlorosilane, methylvinylchlorosilane, and also diorganohalosilane in which the R radicals are the same, such as diphenylchlorosilane, dimethylchlorosilane, diethylchlorosilane, etc.

While the foregoing examples have been limited to only a few of the very many variables within the scope of the present invention, it should be understood that the present invention is directed to the partial reduction of a much broader class of diorganodihalosilane, by use of a wide variety of ethers, previously described. Diorganohalosilane, shown by Formula 1 can be made by reducing diorganodihalosilane of Formula 2 with $LiBH_4$ in the presence of an ether.

What I claim as new and desire to secure by Letters Patent of the United States is:

1. A method which comprises (1) reacting a diorganodihalosilane having the formula, $$R_2SiX_2$$

with $LiBH_4$, in the presence of an ether, where there is utilized per mole of said diorganodihalosilane, from about 0.5 to about 2 moles of a $LiBH_4$ reactant selected from
 (a) $LiBH_4$,
 (b) a mixture of substantially equal molar amounts of LiX and $YBH_4$, and
 (c) a mixture of from about 0.5 to 2 moles of YH, and from about 0.5% to 5% by weight of said diorganodihalosilane, of a member selected from (a) and (b), (2) effecting the separation of borohydride residue from the product of the reaction of (1), and (3) recovering diorganohalosilane from the resulting mixture of (2), where X is a halogen radical, Y is an alkali metal selected from the class consisting of sodium, potassium, rubidium, and cesium, and R is selected from the class consisting of monovalent hydrocarbon radicals, and halogenated monovalent hydrocarbon radicals.

2. A method in accordance with claim 1, where the reaction of said diorganodihalosilane and $LiBH_4$ is performed in the presence of an ether, and from 0.5 to 20%, based on the weight of the diorganodihalosilane of a member selected from titanium tetrachloride and zirconium tetrachloride.

3. A method in accordance with claim 1, where the ether is tetrahydrofuran.

4. A method in accordance with claim 1, where the diorganodihalosilane is a diaryldihalosilane.

5. A method in accordance with claim 1, where the diorganodihalosilane is a dialkyldihalosilane.

6. A method in accordance with claim 1, where the diorganodihalosilane is an alkylaryldihalosilane.

7. A method which comprises (1) reacting a diphenyldichlorosilane with lithium borohydride in the presence of tetrahydrofuran, where there is utilized per mole of diphenyldichlorosilane, from about 0.5 to about 2 moles of a lithium borohydride reactant selected from,
 (a) $LiBH_4$,
 (b) a mixture of substantially equal moles of LiCl and $KBH_4$, and
 (c) a mixture of from about 0.5 to about 2 moles of NaH, and from 0.5% to 5% by weight of diphenyldichlorosilane of a member selected from the class consisting of (a) and (b), (2) effecting the separation of borohydride residue from the product of the reaction of (1), and (3) recovering diphenylchlorosilane from the resulting mixture of (2).

References Cited
UNITED STATES PATENTS 2,726,926 11/1952 Paul et al. _____ 23—14
3,014,025 12/1961 Pearson et al. _____ 260—448.2
3,099,672 7/1963 Cooper et al. _____ 260—448.2

OTHER REFERENCES

Brown et al.: J.A.C.S., 78 page 2582 (1956).
Hurd: "Chemistry of the Hydrides," pp. 30 to 39 and 163, John Wiley and Sons, Inc. (1952).
Klejnot: Inorganic Che., 2, pp. 825 to 828 (1963).

TOBIAS E. LEVOW, *Primary Examiner.*

P. F. SHAVER, *Assistant Examiner.*